US008190732B1

(12) United States Patent
Cooley et al.

(10) Patent No.: US 8,190,732 B1
(45) Date of Patent: May 29, 2012

(54) METHOD AND APPARATUS FOR PROVIDING INFORMATION ASSOCIATED WITH SERVICE PROVIDERS USING A SOCIAL NETWORK

(75) Inventors: Shaun Cooley, El Segundo, CA (US); Keith Newstadt, Newton, MA (US); Laura Garcia-Manrique, Marina del Rey, CA (US); Sourabh Satish, Fremont, CA (US); Brian Hernacki, San Carlos, CA (US); Timothy G. Brown, Fort Edward, NY (US)

(73) Assignee: Symantec Corporation, Mountain View, CA (US)

( * ) Notice: Subject to any disclaimer, the term of this patent is extended or adjusted under 35 U.S.C. 154(b) by 552 days.

(21) Appl. No.: 12/004,710

(22) Filed: Dec. 21, 2007

(51) Int. Cl.
*G06F 15/173* (2006.01)

(52) U.S. Cl. ........ 709/224; 709/204; 709/206; 705/26.3

(58) Field of Classification Search .................. 709/204, 709/206, 224; 705/26.3
See application file for complete search history.

(56) References Cited

U.S. PATENT DOCUMENTS

| | | | | |
|---|---|---|---|---|
| 2002/0059132 | A1* | 5/2002 | Quay et al. | 705/37 |
| 2006/0190281 | A1* | 8/2006 | Kott et al. | 705/1 |
| 2008/0255989 | A1* | 10/2008 | Altberg et al. | 705/40 |
| 2009/0006622 | A1* | 1/2009 | Doerr | 709/225 |
| 2009/0012841 | A1* | 1/2009 | Saft et al. | 705/10 |
| 2009/0112989 | A1* | 4/2009 | Anderson et al. | 709/204 |
| 2010/0318439 | A1* | 12/2010 | Brown | 705/26 |
| 2011/0196923 | A1* | 8/2011 | Marcucci et al. | 709/204 |

* cited by examiner

*Primary Examiner* — Brian P Whipple
(74) *Attorney, Agent, or Firm* — Wilmer Cutler Pickering Hale and Dorr LLP

(57) ABSTRACT

A method and apparatus for providing information associated with service providers using a social network is described. In one embodiment, a method of providing indicia of familiarity with the service providers comprises identifying one or more relationships between one or more service providers and a user using a social network associated with the user and generating information regarding the one or more relationships, wherein the information comprises a social distance between the user and each service provider of the one or more service providers where the social distance represents an indicia of familiarity between the user and each service provider of the one or more service providers.

20 Claims, 4 Drawing Sheets

METHOD AND APPARATUS FOR PROVIDING INFORMATION ASSOCIATED WITH SERVICE PROVIDERS USING A SOCIAL NETWORK

BACKGROUND OF THE INVENTION

1. Field of the Invention

Embodiments of the present invention generally relate to service provider referral systems and, more particularly, to a method and apparatus for providing information associated with service providers using a social network.

2. Description of the Related Art

Most economies are founded upon a system of providing goods and services in exchange for some form of compensation. Specifically, service providers perform various tasks for electronic world and real world scenarios. The tasks may include configuring a firewall or installing new software in an electronic world or paving a driveway in a real world.

Presently, finding trustworthy service providers can be a lengthy and tiresome process. An individual is more likely to trust and give importance to the opinions of people the individual already knows, for example, people with whom the individual has a relationship rather than complete strangers. Accordingly, the individual may engage in various forms of social networking in an effort to find trustworthy service providers. Social networking is a concept in which the individual's personal network of family colleagues, friends, coworkers, acquaintances and the like is utilized to find more relevant connections, for example, referrals to service provides, leads to new clients or jobs, and the like. To search for trustworthy service providers, the individual asks one or more member of his/her social network to refer the individual to one or more service providers.

Current social networking websites present relationships between the individual and one or more service providers. However, such social networking sites do not provide any insight into nature or details of the relationship. Also, some sites employ corporate entities for referring service providers. Usually, the corporate entity accepts money from the service providers in exchange for the referrals. Furthermore, ratings for service providers are unreliable when they originate from the people with whom the individual does not have a familiar relationship. Overall, the present sites do not represent a real world familiarity between the individual and the service providers.

Therefore, there is a need in the art for a method and apparatus for providing information about service providers using a social network.

SUMMARY OF THE INVENTION

Embodiments of the present invention comprise a method and apparatus for providing information regarding service providers using a social network of a user. One embodiment of the present invention relates to a method of providing indicia of familiarity with the service providers. The method comprises identifying one or more relationships between one or more service providers and the social network of a user and generating information regarding the one or more relationships, wherein the information comprises a social distance between the user and each service provider of the one or more service providers where the social distance represents an indicia of familiarity between the user and each service provider of the one or more service providers.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
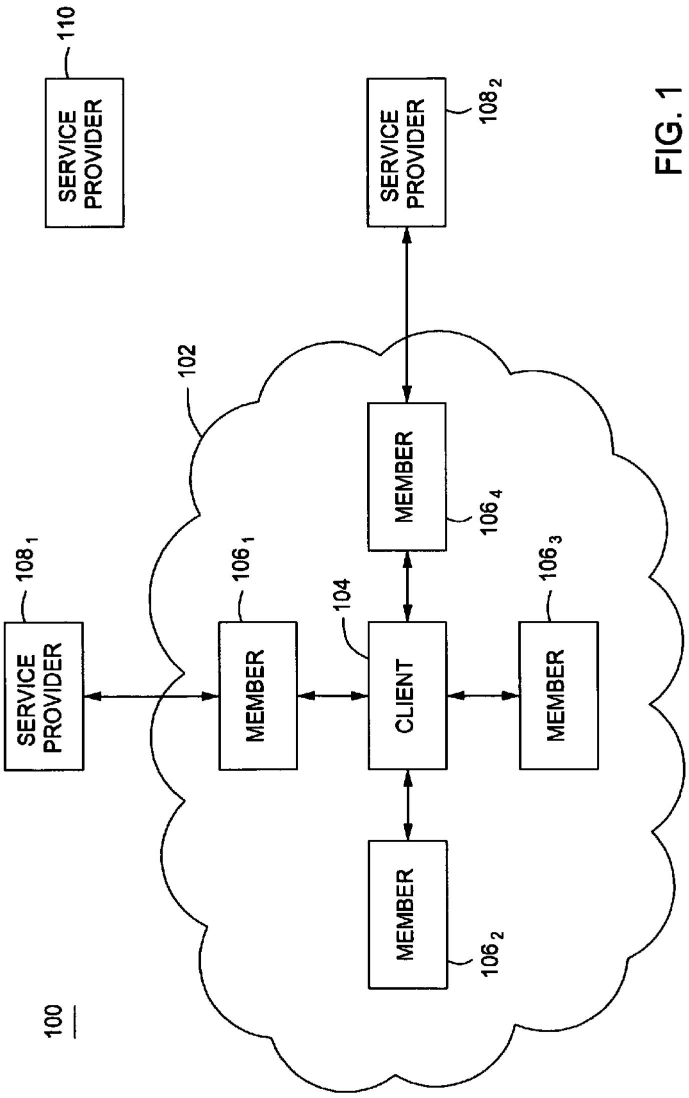
FIG. 1 is a block diagram representation of a system illustrating relationship between a user, members of a social network of the user and service providers in accordance with one or more embodiments of the present invention.

FIG. 1 is a block diagram representation of a system 100 comprising a social network 102 of a client computer 104. The system 100 further comprises members 106 within the social network 102, service providers 108 connected to one or more members of the social network 102, and a service provider 110 outside of the social network 102. The members 106 include any combination of friends, family, co-workers, acquaintances and the like of a user of the client computer 104. Although the members 106 are illustrated as a member $\mathbf{106}_1$, a member $\mathbf{106}_2$, a member $\mathbf{106}_3$, and a member $\mathbf{106}_4$ in FIG. 1, one or more embodiments of the present invention include more than four members of the social network 102. Even though the service providers 108 are illustrated as a service provider $\mathbf{108}_1$ and a service provider $\mathbf{108}_2$ in FIG. 1, one or more embodiments of the present invention include any number of service providers that bear a relationship with one or more of the members 106.

As stated above, the service providers 108 have relationships with one or more of the members 106 within the social network 102 (e.g., the service providers 108 and $\mathbf{108}_2$). On the other hand, the service provider 110 is not connected to any of the members 106 of the social network 102 denoting a lack of a relationship between the service provider 110 and any of the members 106 of the social network 102 of the user 104. As such, the related members of the members 106 are able to provide information regarding the relationships with the service providers 108 but not the service provider 110. Such information may include a review or description of a past performance, costs related to one or more services, a recommendation based on the relationship with a particular service provider, a reputation of the particular service provider within a community, a trustworthiness value, as explained below, and the like.

Accordingly, connections between the client computer 104 and the members 106 represent relationships between the user of the client computer 104 and the members 106. Each relationship differs in various respects (e.g., a length in time of the relationship, an amount of time spent together, a type of the relationship (e.g., blood or marriage relative, family, friend, employer), and the like). In one embodiment, the each relationship can be represented by a social distance, which may be a value that accounts for the various respects that differentiate the each relationship. The social distance represents an indicia of familiarity between the user and any other entity (e.g., any of the service providers 108 or the members 106). Accordingly, the social distance indicates an amount of trust in the judgment of a member of the members 106. Hence, the social distance, as explained herein, refers to a real world familiarity with the user.

Various embodiments of the present invention uses the relationships between the service providers 108 and the social network 102 of the user to provide the information described above and/or referrals to the service providers for the user. In one embodiment, the information provided by the members 106 is processed with respect to the social distance between any one of the members 106 and the user of the client computer 104. For example, the information is presented juxtaposed to the social distance between the user and a member of the members 106 providing the information. As another example, the information is organized by the social distance (e.g., in decreasing order).

Figure 2:
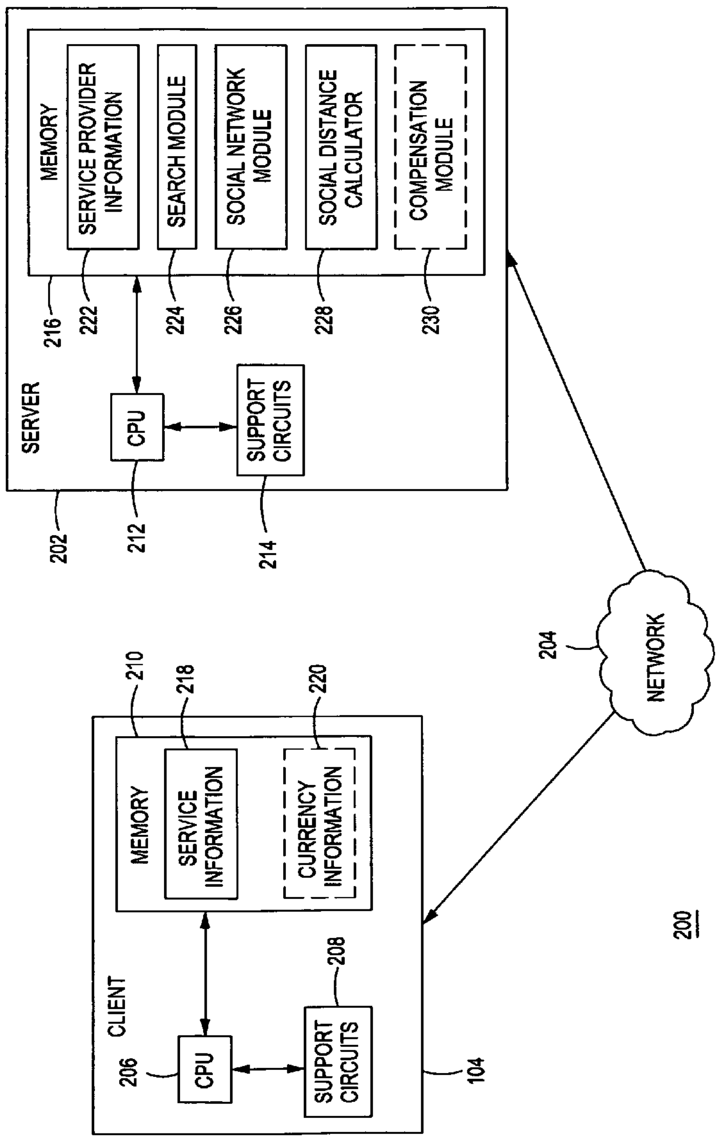
FIG. 2 is a block diagram representation of a system illustrating an environment under which the present invention operates, according to one embodiment of the present invention.

FIG. 2 is a block diagram representation of a system 200 for providing referrals to service providers, according to one more embodiments of the present invention. The system 200 includes the client computer 104 and a server 202, coupled to each other through a network 204.

The client computer 104 includes a Central Processing Unit (CPU) 206, support circuits 208 and a memory 210. The CPU 206 may comprise one or more commercially available microprocessors or microcontrollers that facilitate data processing and storage. The support circuits 208 facilitate operation of the CPU 206 and comprise at least one of clock circuits, power supplies, cache, input/output circuits, and the like. The memory 210 comprises at least one of read only memory (ROM), random access memory (RAM), disk drive storage, optical storage, removable storage, and the like. The memory 210 includes various data, such as service information 218 and currency information 220. The memory 210 further includes various software packages, such as an operating system, a web browser application and the like.

The server 202 includes a Central Processing Unit (CPU) 212, support circuits 214 and a memory 216. The CPU 212 may comprise one or more commercially available microprocessors or microcontrollers that facilitate data processing and storage. The support circuits 214 facilitate operation of the CPU 212 and comprise at least one of clock circuits, power supplies, cache, input/output circuits, and the like. The memory 216 comprises at least one of read only memory (ROM), random access memory (RAM), disk drive storage, optical storage, removable storage, and the like. The memory 216 includes various data, such as service provider information 222. The memory 216 further includes various software packages such as, a search module 224, a social network module 226, a social distance calculator 228 and a compensation module 230.

The network 204 comprises a communication system that connects a computer system by wire, cable, fiber optic and/or wireless link facilitated by various types of well-known network elements, such as hubs, switches, routers, and the like. The network 204 may employ various well-known protocols to communicate information amongst the network resources. For example, the network 204 may be a part of the internet or intranet using various communications infrastructure such as Ethernet, WiFi, WiMax, General Packet Radio Service (GPRS), and the like.

The network 204 enables communication between the client computer 104 and the server 202. The server 202 is configured to enable the user to manage the social network 102 (e.g., establish profiles and relationships with the members 106). The client computer 104 is configured to communicate the service information 218 to the server 202, where the service information 218 describes a service for a service provider to perform.

The service information 218 is communicated by the user and describes a service needed by the user with which the server 202 responds with one or more service providers capable of performing the service. In one embodiment, the service information 218 is a form to be completed by the user, such as a list of available services accompanied by check boxes. The user simply checks any of the available services (e.g., 'configure firewall', 'install firewall', 'configure AV', 'install AV' and the like) and submits the service information 218 to the server 202. In another embodiment, the service information 218 is a description of the service in the form of a search query. The user submits the search query to the search module 224 in the server 202. The search module 224 performs the search and presents one or more matching service providers on a web page. In one embodiment, the search query includes information describing various areas of the service (e.g., an XML-based query which includes attributes and values for the service, such as options, costs, schedules, requirements, and the like).

As an option, the currency information 220 enables the user to pay for the services with real currency, virtual currency or points. The currency information 220 includes an amount of available currency (e.g., real currency, virtual currency, points and the like). In a point system, the users compensate the service providers with the points, which the service providers exchange to obtain other services from other service provides within the social network. The virtual currency is used instead of the real currency to enable bartering of goods and services between various members of the social networking site provided by the server 202.

The server 202 provides information associated with one or more service providers to the user in accordance with various embodiments of the present invention. In one embodiment, the service provider information 222, the search module 224, the social network module 226 and the social distance calculator 228 cooperate to provide the information to the user. The service provider information 222 includes information regarding the plurality of service providers. The service provider information 222 may be a database that includes each service provider as well as any related information, such as a list of offered services, ratings, feedback, recommendations, costs and the like. The search module 224 is configured to search a plurality of service providers for one or more service providers that match (e.g., approximately or exactly) the search query given by the user. The social network module 226 provides information regarding the social network 102 of the user. The social network module 226 is configured to facilitate access to and display information (e.g., a profile) pertaining to the members 106 of social network 102 associated with the user and/or the plurality of the service providers. The social distance calculator 228 is configured to compute the social distance between the user and any of the members 106 and/or the plurality of service providers, as explained above.

In operation, the search module 224 searches the service provider information 222 for the one or more service providers that match the service information 218 provided by the user (e.g., the search query). In another embodiment, the service information 218 specifies one or more desired services, an amount the user is willing to pay, and/or a threshold for the social distance between the user and any of the one or more service providers. For example, the search module 224 may search for one or more service providers that are capable of configuring a firewall, charge less than $20.00 and/or within a particular social distance (e.g., a very close friend of a family member of the user, a family member of a colleague, a relative of an employer, a son of an accountant of the user, a relative of a very close friend, and the like). In one embodiment, the search module 224 identifies relationships between the one or more service providers that match the service information 218 and user via the members 106 of the social network 102.

The social distance calculator 228 computes social distances between the user and any other entity. In one embodiment, the social distance calculator 228 computes the social distance based on the relationship between the user and a particular service provider of the one or more service providers for the search module 224. In one embodiment, the social distance calculator 228 computes a social distance between the user and any member that is related (e.g., connected) to the particular service provider. The social distance may be a value representing an indicia of familiarity (e.g., real world familiarity) or closeness of the relationship between the user and the particular service provider.

The search module 224 is configured to generate information regarding the relationships between the user and the one or more service providers that match the service information 218. In one embodiment, the search module 224 utilizes the social distance calculator 228 to facilitate the generation of the information. Various data regarding the one or more service providers (e.g., a profile, reviews, feedback and the like provided by the social network module 226) may also be used to generate the information regarding the relationships.

Therefore, the information may include the profile of the particular service provider, the social distance between the member of the social network of the user and the particular service provider as well as feedback for the particular service provider by any of the members 106 of social network 102 of the user based on past performances, relationships, ratings, reputations and the like. Such information is employed by the user to find and select a trustworthy service provider of the one or more service providers.

Optionally, the compensation module 230 manages compensation provided to any of the plurality of service providers from the user. For example, the compensation module 230 is configured to provide the user with a mechanism for compensating a particular service provider (e.g., a link to a PAYPAL address, bank account information and the like). In another example, the compensation module 230 facilitates an agreement, in writing, between the particular service provider and the user, which may direct the server 202 to release currency to the particular service provider upon satisfactory completion of the service. The currency may be, in the form of virtual currency, real currency or a number of points.

After the completion of the service by the particular service provider, the user may evaluate the particular service provider and/or the service. For example, the user may rate, review or otherwise provide feedback for the particular service provider based on the performance of the service. Such evaluation may be displayed alongside future search results. Further, the evaluation is used to compute a trustworthiness value for the service provider. For example, the trustworthiness value indicates the likelihood that the particular service provider will perform the service to the satisfaction of any customer. In one embodiment, the trustworthiness value is computed based on the ratings, the feedback, the reviews and/or the computed social distance.

Optionally, the social network module 226 may provide certifications for any of the plurality of service provider on the basis of the trustworthiness values of each service provider. Such certifications may be provided by a third party (e.g. certification/accreditation organizations, social networking sites and the like). In one embodiment, the certification is a class three digital certificate. In another embodiment, the certification is a trustworthiness value produced by examining a security practices and/or potential identity. For example, the trustworthiness value may be based on an examination that covers a security of computer systems employed by the each service provider, a SHASTA community rating and the like.

Alternatively, the search module 224 distributes the service information 218 provided by the user to the plurality of service providers (e.g., the one or more service providers that match the service information 218). According to various alternative embodiments, the one or more service providers respond to the user with one or more bids to perform the service. In one alternative embodiment, the service information 218 includes a description of the service as well as a price the user is willing to pay, a schedule for the performance of the service, one or more other requirements and/or the like. Accordingly, the user may select any or none of the one or more service providers. Optionally, if the user does select a service provider to perform the service based on the submitted bid, the user may compensation the service provider through the compensation module 230.

Figure 3:
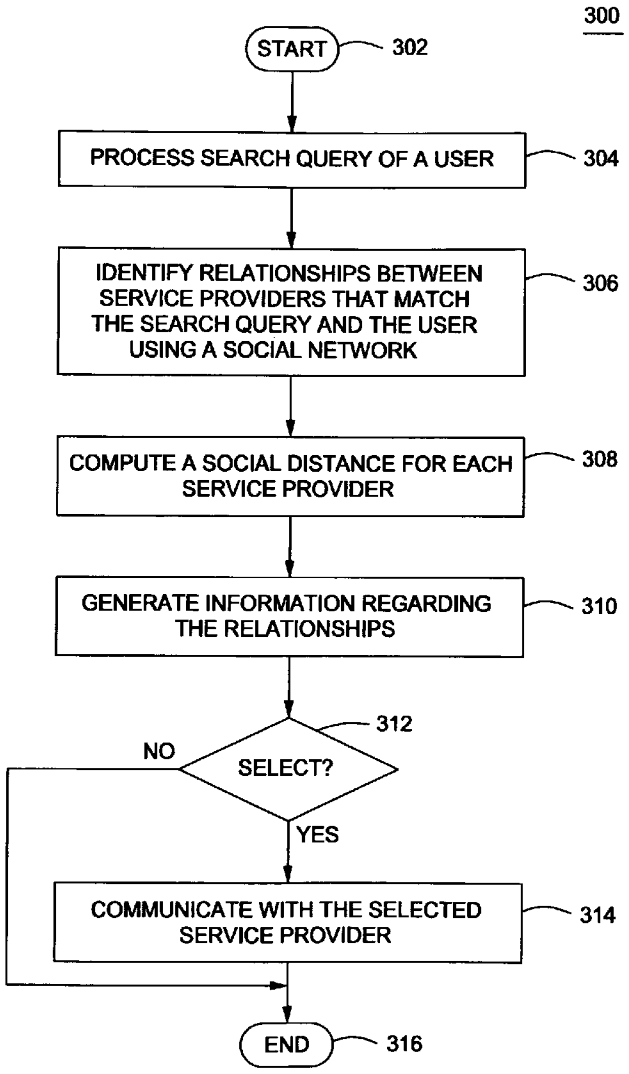
FIG. 3 is a flow diagram representation of a method of searching service provider information for the service providers with reference to a social distance according to one embodiment of the present invention.

FIG. 3 is a flow diagram of a method 300 of providing referrals for one or more service providers. The method 300 starts at step 302 and proceeds to step 304. At step 304, a search query provided by the user is processed. In one embodiment, the user creates and submits the search query to a social networking website presented by the server 202 using the social network module 226. The search module 224 searches the plurality of service providers for one or more service providers that match the search query.

At step 306, one or more relationships between the one or more service providers and the user are identified using a social network associated with the user. At step 308, a social distance for each of the one or more service providers is computed. As explained above, the social distance represents various indicia of familiarity (e.g., real world familiarity) between the user and any other entity (e.g., members 106 within the social network 102, the plurality of service providers). At step 310, information regarding the one or more relationships is generated. The information includes the social distances computed above. In one or more embodiments, the information further includes ratings, reviews, recommendations, feedback, certifications, trustworthiness values and/or the like for the each service provider, as explained above.

At step 312, a determination is made as to whether the user selects any of the one or more service providers to perform a service. If the user selects a service provider, the method 300 proceeds to step 314. At step 314, the user communicates with the selected service provider. The user may eventually engage the selected service provider to perform the service. Optionally, the user may compensate the selected service provider through the server 202, as explained above. Optionally, the selected service provider may be rated or reviewed through the server 202 (e.g., the social networking site). If the user does not select any of the one or more service providers, the method proceeds to step 316. The method 300 ends at step 316.

Figure 4:
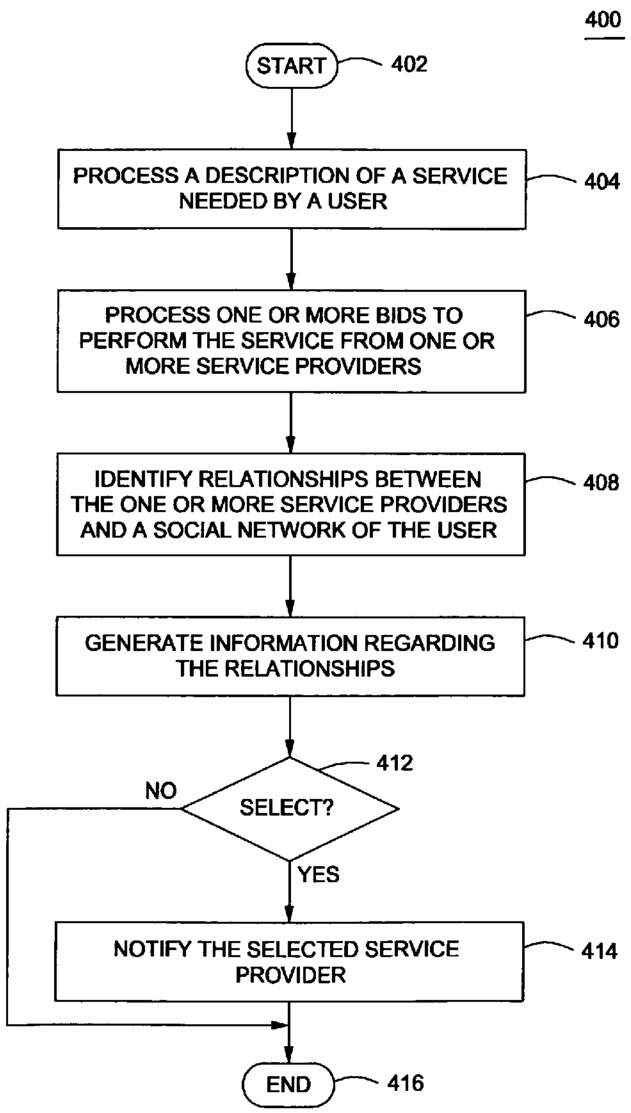
FIG. 4 is a flow diagram representation of a method of selecting the service provider using a bidding system according to one or more embodiments of the present invention.

FIG. 4 is a flow diagram representation of a method 400 of selecting a service provider from one or more bids, in accordance with one or more embodiments of the present invention. For example, a user of a computer (e.g., the client computer 104) may select a service provider (e.g., the service provider $108_1$) from one or more bids submitted by one or more service providers after the user submits a description of a service to a social networking site. A bid, generally, indicates an acceptance of all or most of the requirements presented in the description of the service. For example, the bid may indicate an agreement to perform the service at the price specified by the user.

The method 400 starts at step 402 and proceeds at step 404. At step 404, a description of a service is processed. The description of a service may include a price the user is willing to pay, various details related to the service, a proposed schedule for completing the task and the like. At step 406, one or more bids from one or more service providers are processed. At step 408, one or more relationships between the one or more service providers and a social network of the user are identified. At step 410, information regarding the relationships is generated. The information may include various details regarding the one or more service providers (e.g., one or more profiles), one or more social distances between the user and the one or more service providers, ratings and feedback for the one or more service providers given by various members of a social network of the user. At step 412, a determination is made as to whether to select any of the one or more service providers on the basis of the generated information. If the user selects a service provider, the method 400 proceeds to step 414. If the user does not select a service provider, the method 400 proceeds to step 416. At step 414, the selected service provider is notified as to the acceptance of the bid by the user. For example, a message is sent to the selected service provider. The method 400 ends at step 416.

While the foregoing is directed to embodiments of the present invention, other and further embodiments of the invention may be devised without departing from the basic scope thereof, and the scope thereof is determined by the claims that follow.

What is claimed is:

1. A method of providing indicia of familiarity with service providers, comprising:

processing a query for a service using a computer, wherein the query represents a solicitation for bids to perform the service;

processing a plurality of bids received in response to the query using the computer, wherein the plurality of bids are from a plurality of service providers to perform the service;

identifying at least one relationship between at least one service provider of a plurality of service providers and a user using a social network associated with the user using the computer; and generating information regarding the at least one relationship using the computer, wherein the information comprises a social distance between the user and each service provider of the at least one service provider where the social distance represents an indicia of real world familiarity between the user and each service provider of the at least one service provider, wherein the indicia of real world familiarity comprises an indicia computed based on a length of time in a relationship and an amount of time spent together; and providing the plurality of bids to the user along with the information regarding the social distance between the user and each service provider.

2. The method of claim 1, wherein the information further comprises information pertaining to a service performed for a member of the social network by any of the at least one service provider.

3. The method of claim 2, wherein the information further comprises at least one of a review, a recommendation or a rating provided by the member of the social network.

4. The method of claim 3, wherein the information further comprises at least one of a feedback or a rating provided by the member of the social network, wherein the member has an equivalent social distance as the service provider.

5. The method of claim 1, further comprising selecting a service provider among the at least one service provider based on the information.

6. The method of claim 5, further comprising compensating the selected service provider for a service performed by the service provider using currency.

7. The method of claim 6, wherein the currency is at least one of virtual currency or at least one point.

8. The method of claim 5, further comprising rating the selected service provider on a service performed by the service provider.

9. The method of claim 1, further comprising evaluating the service provider to compute a trustworthiness value for the service provider.

10. The method of claim 9, further comprising certifying a service provider based on the trustworthiness value.

11. The method of claim 1, further comprising:

selecting a bid from the plurality of bids based on the information.

12. An apparatus for providing indicia of familiarity with service providers, comprising:

electronic memory storing a plurality of modules including:

a social network module for accessing a social network associated with a user;

a search module, wherein the search module is configured to:

process a query for a service using a computer, wherein the query represents a solicitation for bids to perform the service;

process a plurality of bids received in response to the query using the computer, wherein the plurality of bids are from a plurality of service providers to perform the service;

identify at least one relationship between at least one service provider and the social network associated with the user and generating information regarding the at least one relationship, wherein the information comprises a social distance between the user and each service provider of the at least one service provider where the social distance represents an indicia of real world familiarity between the user and the each service provider of the at least one service provider, wherein the indicia of real world familiarity comprises an indicia computed based on a length of time in a relationship and an amount of time spent together.

13. The apparatus of claim 12, further comprising a social distance calculator for computing the social distance between the user and the each service provider of the at least one service provider.

14. The apparatus of claim 12, further comprising a compensation module for processing compensation provided by the user in exchange for performance of a service.

15. The apparatus of claim 12, wherein the search module presents a plurality of bids to perform a service from the plurality of service providers for the user to select.

16. A system for providing indicia of familiarity with service providers, comprising:

a client computer, wherein a user of the client computer is coupled to a social network;

a server, comprising:

a social network module for accessing the social network, processing a query for a service, and processing a plurality of bids received in response to the query, wherein the plurality of bids are from a plurality of service providers to perform the service and wherein the query represents a solicitation for bids to perform the service; and a search module for identifying at least one relationship between at least one service provider and the user using the social network and generating information regarding the at least one relationship, wherein the information comprises a social distance between the user and each service provider of the at least one service provider where the social distance represents an indicia of real world familiarity between the user and the each service provider of the at least one service provider, wherein the indicia of real world familiarity comprises an indicia computed based on a length of time in a relationship and an amount of time spent together.

17. The system of claim 16, wherein the search module presents at least one bid to perform a service from the at least one service provider for the user to select.

18. The system of claim 16, wherein the server further comprises a social distance calculator for computing the social distance between the user and at least one of the each service provider of the at least one service provider or a member of the social network having a relationship with the each service provider of the at least one service provider.

19. The system of claim 16, wherein the server further comprises a compensation module for processing compensation provided by the user in exchange for performance of a service performed by any of the plurality of service providers.

20. The system of claim 19, wherein the compensation comprises a virtual currency accepted for bartering on the social network.

* * * * *